(12) United States Patent
Lupton

(10) Patent No.: US 6,328,304 B1
(45) Date of Patent: Dec. 11, 2001

(54) VEHICLE FOR FOOTBALL GAME

(75) Inventor: William George Lupton, Ripon (GB)

(73) Assignee: Econ Engineering Limited, Ripon (GB)

( * ) Notice: Subject to any disclaimer, the term of this patent is extended or adjusted under 35 U.S.C. 154(b) by 0 days.

(21) Appl. No.: 09/485,260

(22) PCT Filed: Aug. 6, 1998

(86) PCT No.: PCT/GB98/02258

§ 371 Date: May 20, 2000

§ 102(e) Date: May 22, 2000

(87) PCT Pub. No.: WO99/07448

PCT Pub. Date: Feb. 18, 1999

(30) Foreign Application Priority Data

Aug. 6, 1997 (GB) ............... 9716584

(51) Int. Cl.⁷ ............................ A63B 67/00
(52) U.S. Cl. ............... 273/108.1; 273/129 R; 446/435; 446/424; 446/456; 414/462; 180/215
(58) Field of Search ............... 446/435, 431, 446/424, 427, 437, 441, 442, 454, 456, 460; 180/210, 215, 216; 414/462; 273/108, 108.1, 108.56, 129 S, 129, 22, 129 R, 129 W (56) References Cited

U.S. PATENT DOCUMENTS 3,240,201 * 3/1966 Shelton ............... 446/435 X
4,346,893 * 8/1982 Landsinger et al. ............... 273/108.56
4,352,348 * 10/1982 Griffith ............... 124/78
4,593,906 * 6/1986 Sharma ............... 273/129 R
5,378,191 * 1/1995 Ryan ............... 446/424
5,597,165 * 1/1997 Rundle et al. ............... 273/442
5,759,083 * 6/1998 Polumbaum et al. ............... 446/435
6,068,537 * 5/2000 Lupton ............... 446/435

FOREIGN PATENT DOCUMENTS

WO 97/17110  5/1997 (WO).

* cited by examiner

Primary Examiner—Raleigh W. Chiu
(74) Attorney, Agent, or Firm—Klauber & Jackson (57) ABSTRACT

The invention provides a game apparatus which is in the nature of a vehicle or an attachment for a vehicle, the vehicle being operated by a driver, who travels with the vehicle. The idea is that the apparatus is equipped to receive from a play surface, hold and propel over the play surface a play member, in particular a ball. The apparatus can be described as a motorized version of football. The apparatus has an inlet by which the ball is received, and either the ball is propelled back out of the inlet or out of either of one or more separate outlets in the apparatus. When the ball enters the inlet it is held by a holding plate which rests, by gravity, on the top of the ball.

10 Claims, 8 Drawing Sheets

VEHICLE FOR FOOTBALL GAME

This invention relates to game apparatus, which is of a type which in use is propelled over a surface and has a means whereby a play member, such as a ball, which moves over the surface, can be caught by the apparatus, held thereby, and eventually propelled from the apparatus over the surface towards an objective, such as a goal, or other similar apparatus.

The apparatus may be in the form of a vehicle which is manually propelled, e.g. a bicycle type machine, or vehicle with its own prime mover, e.g. an engine or motor, or it may be in the form of an attachment which is for connection to such a vehicle, the vehicle being of a size to accommodate a human driver, and the apparatus defining a front, sides and a rear.

Basically, therefore the apparatus is in effect a means whereby a game similar to or based upon soccer can be played, using motorised machines.

There has already been disclosed in International Patent Application No. WO/97/17110, an apparatus of the type described above, and in such apparatus there is a ball receiving funnel at the front of the apparatus, into which the ball rolls when it is caught by the apparatus, and the ball is adapted to be propelled from the apparatus to either side of same.

Other known forms of apparatus of the type to which the invention retates comprise a ball catching means at the front, and the catching means is adapted to propel the ball from the front in the opposite direction from which it was caught.

A problem with the known arrangements, it has been found, is that should the apparatus, after it has caught the ball, stop suddenly or change direction, the ball can undesirably roll from the apparatus and become free on the surface, and this interrupts the flow and enjoyment of the game.

Another form of the same problem is that if the ball is travelling towards the machine and the machine towards the ball, then the force of the impact between ball and machine can cause the ball to bounce away from the machine, which impairs quality of play.

The present invention addresses this problem, and in accordance with the invention there is provided in an apparatus of the type to which the invention relates, a ball holding plate means which rest on the top half of the ball when it has been caught by the apparatus, to prevent unwanted discharge of the ball from the apparatus.

The ball holding plate means may be in the form of a plate of metal, plastics or the like, but this is not essential, and the plate means could take other forms, for example, it could be a bar or bars, or a framework with a tightly strung net across it, similar to a tennis racket, or it could be a framework with stitched in canvas panels, or glued in plastic net or sheet. Indeed, it may take any of a number of forms.

The plate means may rest on the ball by virtue of its own weight, which will be calculated to be sufficient to perform the function of holding the ball in normal playing conditions, but not too great to create so much friction to prevent the ball from rolling as the vehicle is moving during play.

The plate means may be carried by flexible members such as ropes (which may be elastic) or chains, or by a guide which is slidably held in a frame part of the apparatus, so as to be free to move up and down, the arrangement being that when the ball is caught by the apparatus and moves to a position under the plate means (which it will be compelled to do), the plate means rises from an initial rest position, and then rest on top of the ball, and when the ball is propelled from the apparatus, the plate means drops back to the initial position. A suitable stop limits the extent to which the plate means drops, and defines the initial position.

The apparatus may otherwise be in each and every respect and variation similar to the apparatus set forth in said International Application, or it may be of the type wherein the ball is caught at the front, in a mouth for example, and propelled from the front, or indeed in any other direction.

The plate means may be provided with anti-friction means, such as anti-friction rolling elements which engage the ball and limit the friction between the ball and the plate means as the ball is carried with the apparatus during movement thereof.

Figure 1:
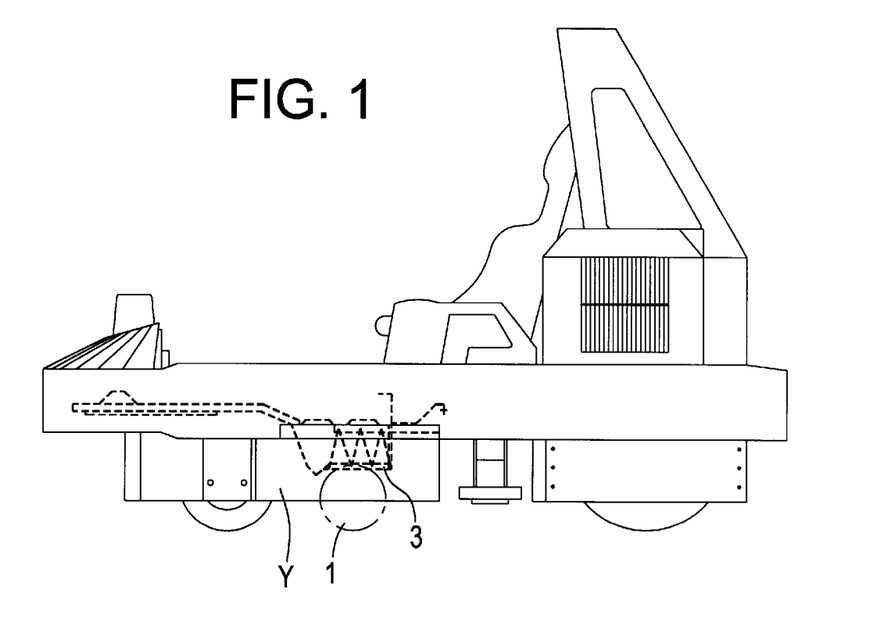
Figure 2:
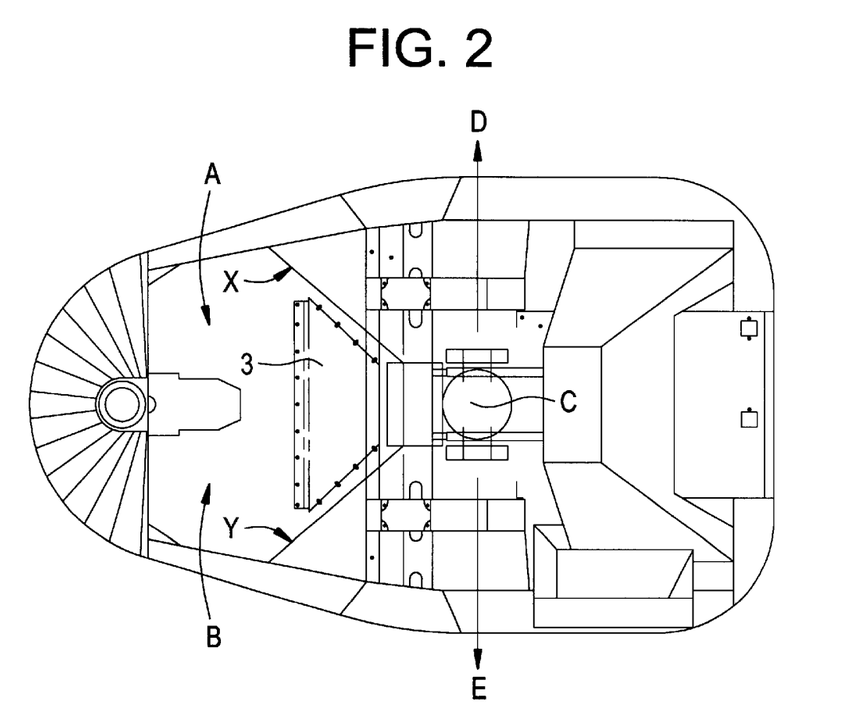
Figure 3:
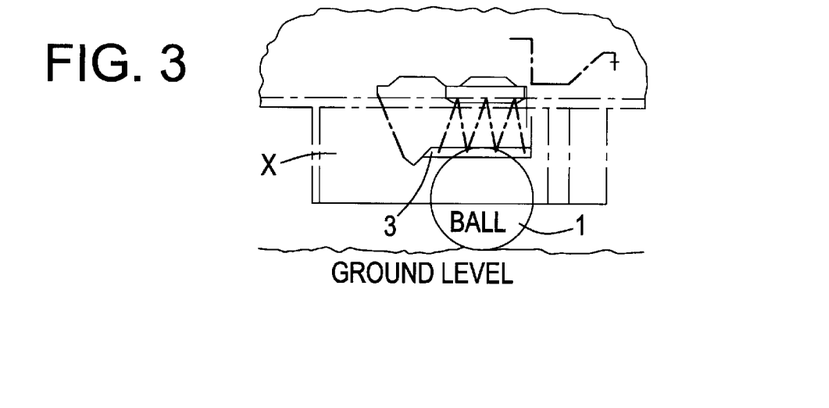
Figure 4:
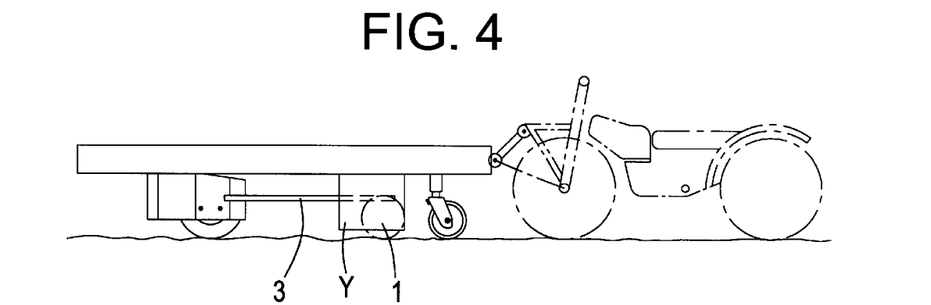
Figure 5:
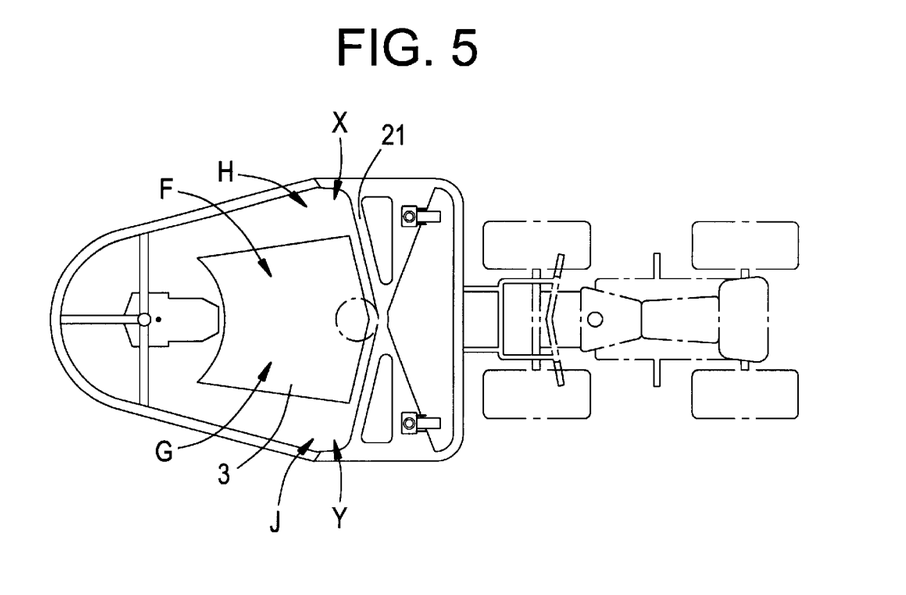
Figure 6:
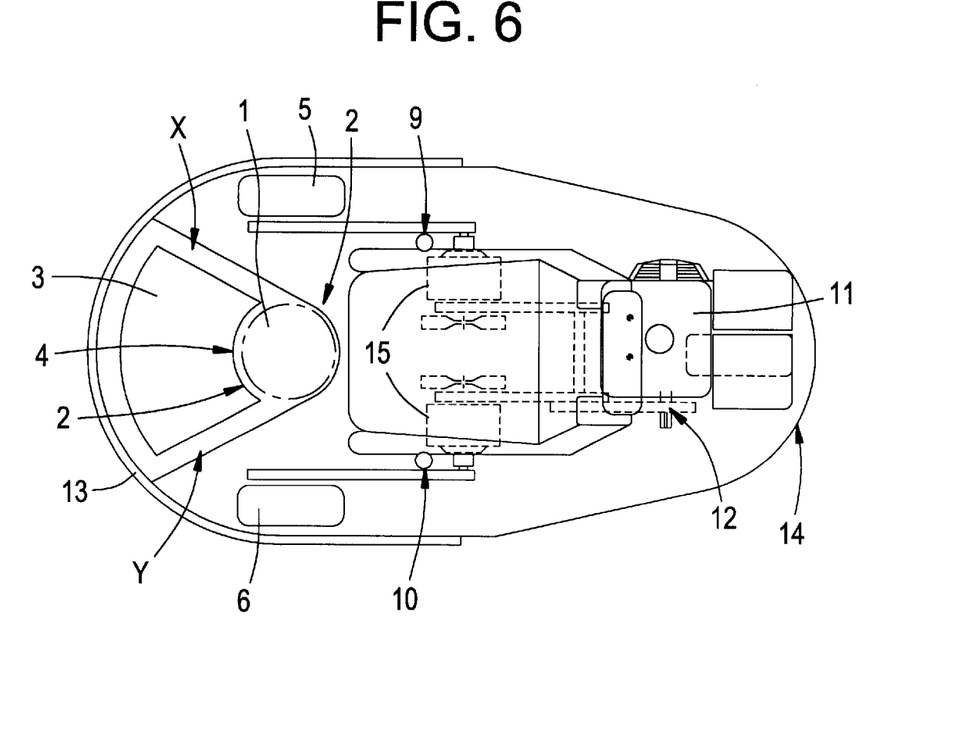
Figure 7:
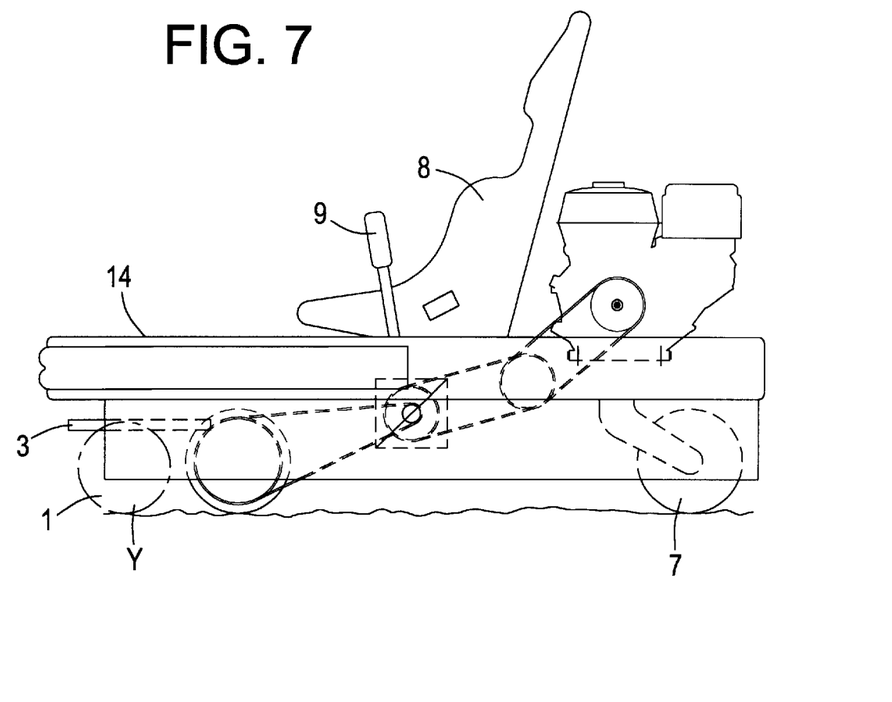
Figure 8:
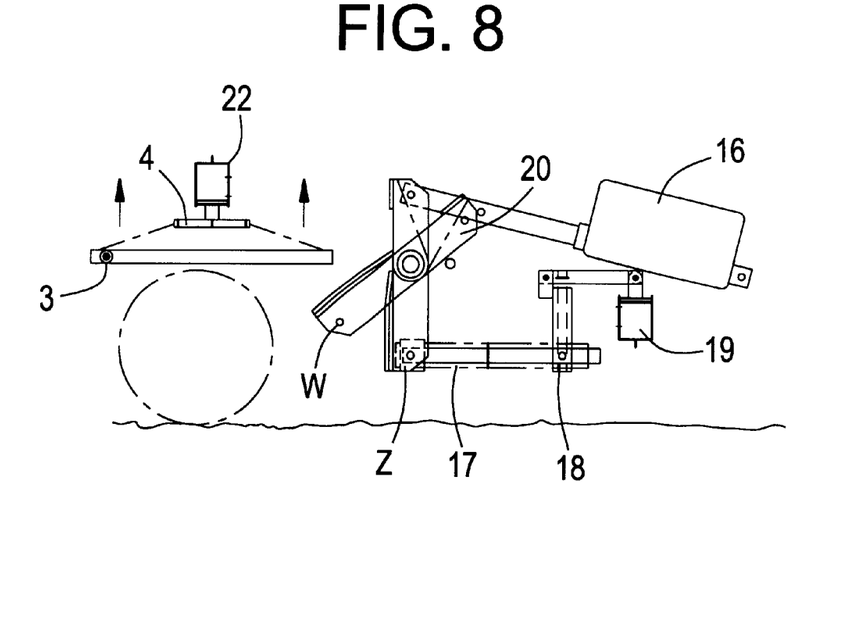
Figure 9:
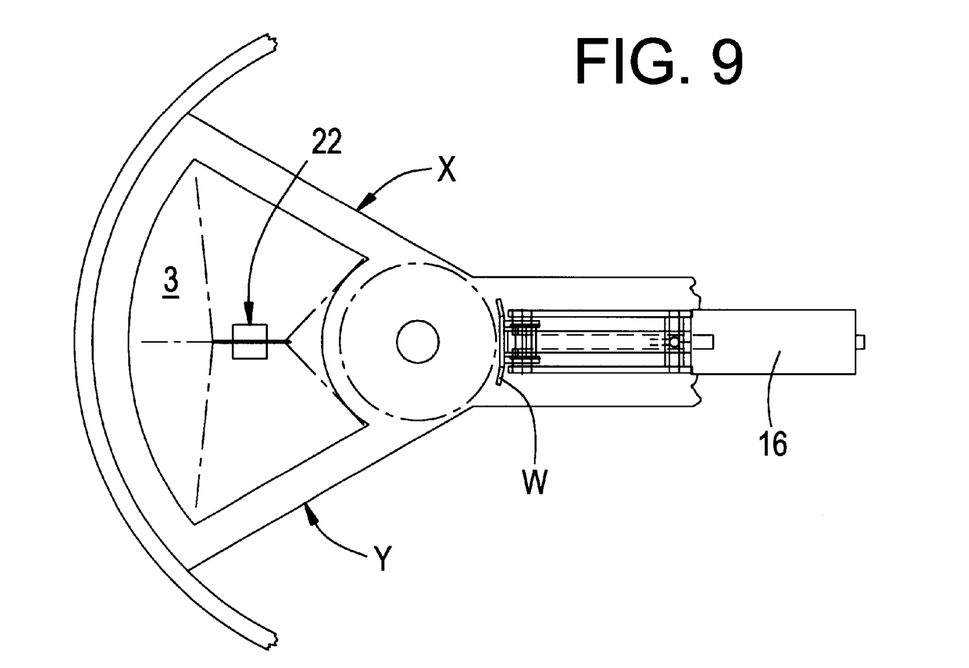

An embodiment of the invention will now be described by way of example, with reference to the accompanying drawings, wherein, FIG. 1 is a side view of a vehicle forming apparatus according to one embodiment of the present invention;

FIG. 2 is a plan view of the vehicle shown in FIG. 1;

FIG. 3 is an enlarged side view of the ball holding means of the vehicle of FIG. 1;

FIG. 4 is a side view of apparatus according to another embodiment of the invention in the form of an attachment for a vehicle;

FIG. 5 is a plan view of the apparatus shown in FIG. 4;

FIG. 6 is a plan view of a vehicle forming apparatus according to another embodiment of the invention;

FIG. 7 is a side view of the vehicle shown in FIG. 6;

FIG. 8 is an enlarged side view showing the ball holding means of the vehicle of FIG. 7;

FIG. 9 is a plan view of the holding means shown in FIG. 8.

Figure 10:
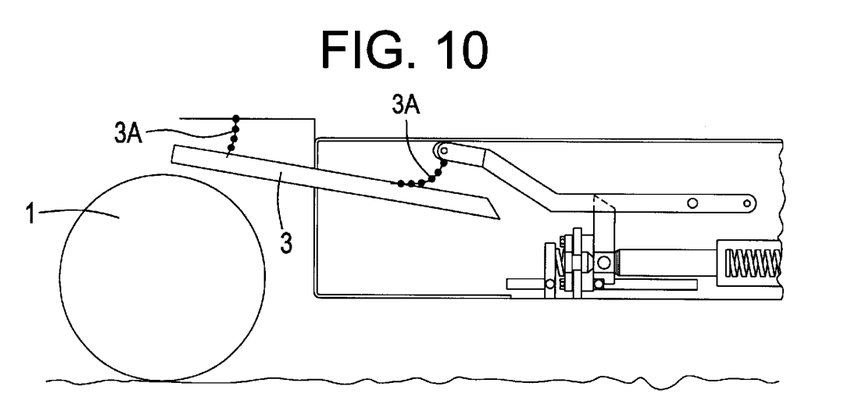
Figure 11:
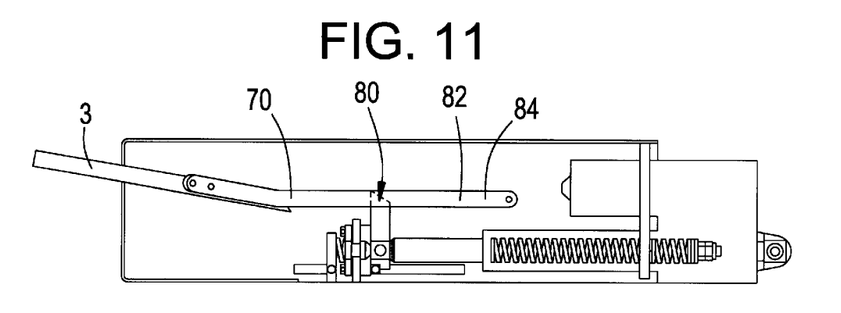
Figure 12:
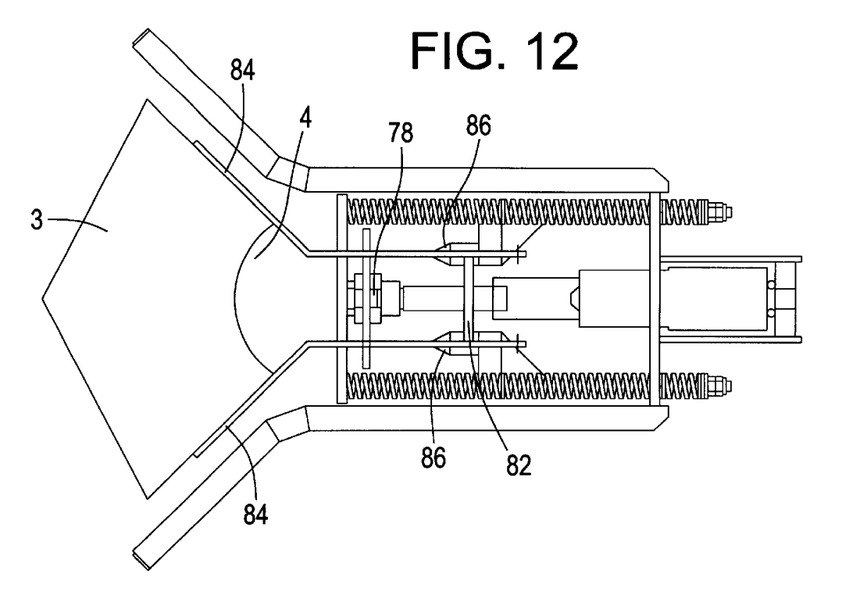
Figure 13:
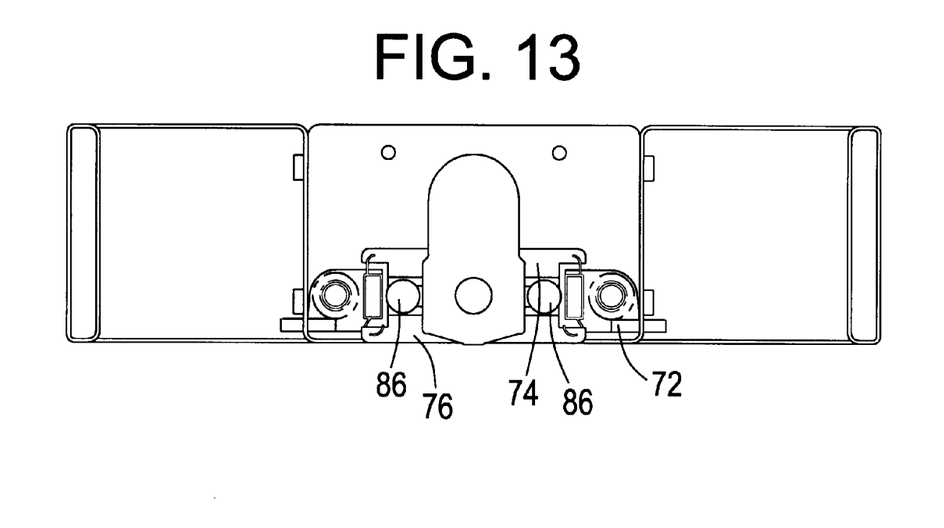
Figure 14:
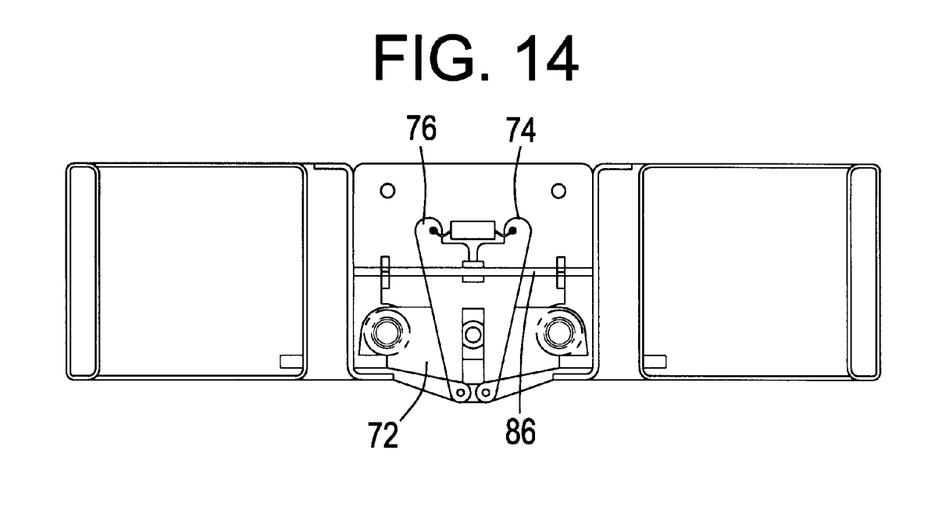
Figure 15:
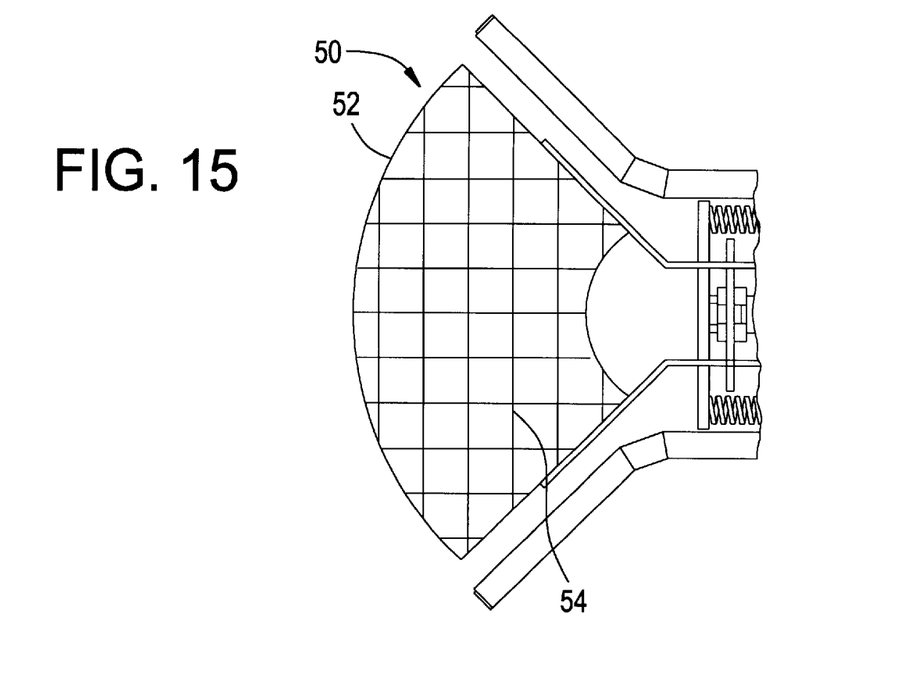
Figure 16:
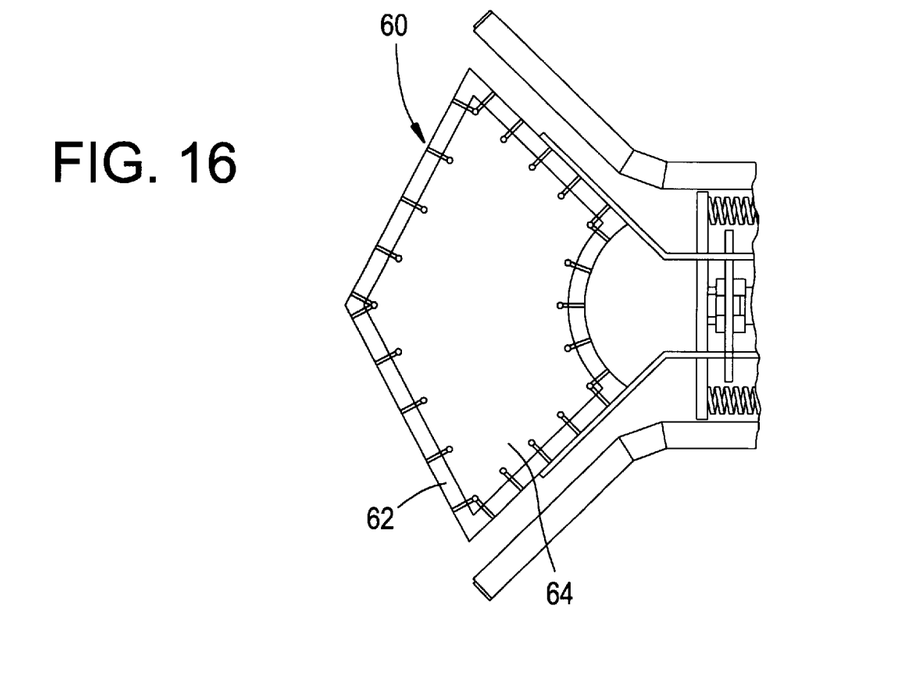
Figure 17:
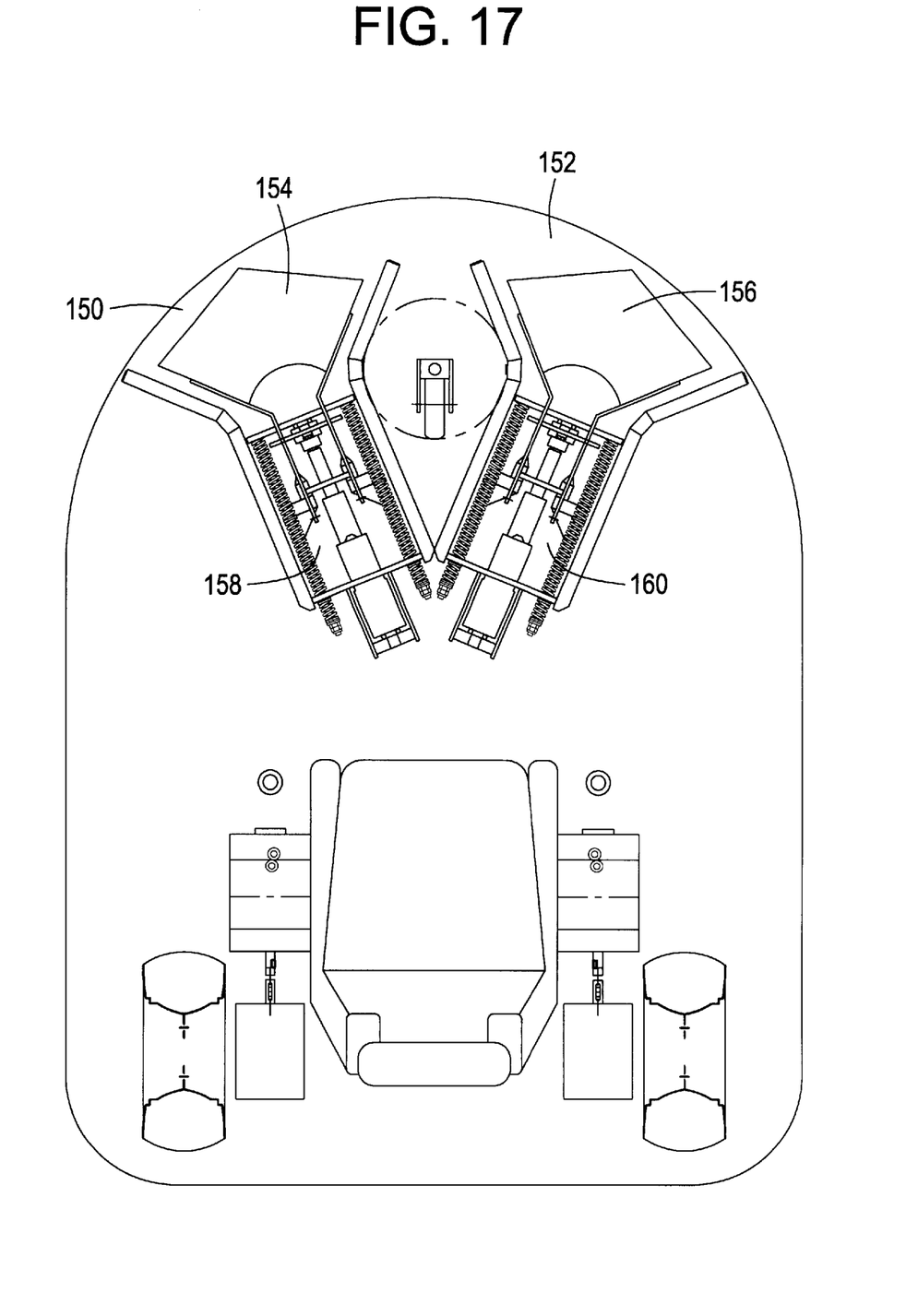

FIG. 10 is a side view showing another form of supporting the ball holding plate;

FIGS. 11, 12 and 13 are respectively a side view, plan and end view of a ball ejection mechanism usable with a vehicle having a front end receipt and ejection arrangement;

FIG. 14 is a view similar to FIG. 13, showing a modification;

FIGS. 15 and 16 ate plan view respectively showing other embodiments of holding means; and FIG. 17 shows in plan a vehicle according to another embodiment of the invention.

The object of this invention is to enable apparatus which is designed to catch, hold and eject a ball, such as a football, to be improved with a ball stabilising device. An existing apparatus is set forth in International Patent Application PCT/GB96/02634 dated Oct. 30, 1996. The apparatus disclosed therein is modified according to this invention by having a ball holding means such as a plate, either as shown in FIGS. 1 and 2, wherein the apparatus is a vehicle, or as illustrated in FIGS. 3, 4 and 5, when the apparatus is an attachment for a vehicle. When the apparatus is an attachment it may be propelled by any existing vehicle, but preferably the vehicle is manually operated machine such as a bicycle or a small tractor or a machine referred to as an all-terrain vehicle e.g. a quad bike.

Alternatively, the ball holding means could be built into a special purpose-built ball playing machine as illustrated in FIGS. 6 and 7.

The ball catching vehicle as illustrated in FIGS. 1 and 2 receives the ball 1 at the front corner at either side of the front wheel as illustrated by arrows A and B and holds the ball at position C and will eject the ball at the side from positions either D or E.

In the case of the vehicle in FIG. 6 the ball 1 is received and held in the retaining area 2 by the ball holding plate 3.

FIGS. 15 and 16 show two alternative ball holding means 50 and 60 respectively in the form of a frame 52 strung with netting 54 or a frame 62 covered by a canvas or the like sheet 64.

All ball playing vehicles or attachments have ball scoop plates which are of a funnel shape to enable the player to drive the apparatus to catch the ball and funnel the ball into the ball holding area. On all drawings these funnel plates ate referred to as items X and Y.

The ball holding plate 3 is suspended in a free hanging fashion for example by ropes or chains 3A shown in FIG. 10, above the ball at a height so that when the ball enters the funnel area, the ball lifts the plate and the weight of the plate is carried by the ball. The plate is retained in any form of suspension or sliding mechanism so that it maintains its position within the shape of the funnel and above the area where the ball is held. The plate 3 may lie at an angle as shown in FIG. 10, with the front end higher than the teat end to facilitate catching the ball 1.

In the case of FIGS. 1 and 2 the ball will pass from the holding plate 3 into a separate ball ejection mechanism where the ball is contained at C by other means before being ejected in directions D or E.

In FIGS. 3, 4 and 5 the ball is held underneath the plate but as the attachment is steered then the ball is free to roll along the vertical faces of the ball funnel between X and Y but should the driver slow the machine down the ball will not run away from the plate 21 as plate 3 is resting on the ball and holding it in that position.

With reference to FIG. 6 the ball holding plate has a cut out as indicated by item 4, so when the ball is in the holding position 2, the plate 3, being on loose suspension, will be hanging in the front of the ball preventing any ball escape but still allowing the ball to roll freely on the playing surface.

A further unique and independent feature with the apparatus in FIGS. 6 and 7 is that the ball is held on the same axis as the two driving wheels 5 and 6 with the machine being carried at the rear on a further castor wheel 7.

The driver seated in the seat 8 can operate two separate control levers 9 and 10 to control each wheel 5 or 6, so that the wheels can travel both in the same direction to take the ball forward, or alternatively one wheel can be rotated in one direction and the other wheel in the opposite direction, in which case, the vehicle will turn about a centre on which the ball lies, and the ball will hardly move or remain stationary.

Each of the vehicles, as exemplified in FIGS. 6 and 7, can be powered by a petrol engine 11, powering an electric clutch 12, which in turn is connected to a rubber compression bumper 13 extending throughout the length of which is a compression but spring-loaded electrical switch so that should the vehicle 14 come into contact with any other apparatus, or the barrier surrounding the play area, then the vehicle will automatically stop for a pre-determined length of time to deter the driver from being too aggressive. This ensures that the game is of non-physical contact and the drivers will lose playing time when the machines 14 are stationary because of the touch bumper time penalty. Likewise this penalty mechanism may be remotely controlled by an independent referee.

As an alternative transmission method, the petrol engine 11 could be replaced by electric batteries and the transmission 15 shown, could be replaced by electric motors or any other conventional form of transmission could be used.

Whereas in FIG. 1, the ball is received in positions A or B and ejected from D or E, with an attachment as in FIGS. 3, 4 and 5 the ball will be received at either side of the front castor wheel, in a position indicated by letter F or G and ejected from positions H or J by turning the attachment quickly through a tight turning angle in one or other direction. This will eject the bill from the opposite side as it clears from underneath the ball holding plate 3.

In the configuration as illustrated in FIGS. 6 and 7 the ball is caught at the front by the funnel shape as indicated with X and Y. The ball plate 3 covers the majority of the ball catching and holding area but has a cut out 4 in which the ball locates.

Behind the holding location 2 as shown in FIGS. 8 and 9 is a spring-loaded ball ejector, The springs 17 of the ejector are tensioned using an electric actuator or alternatively an hydraulic ram or alternatively a manual screw method so that a kicking arm W can be propelled to the position as indicated by the dotted lines, to propel the ball from the apparatus. By extending an actuator 16, the springs 17 are compressed and the compression is held with a simple latch number 18 and when the springs are compressed and latched in that position, the actuator returns to its closed position as illustrated at 20 in dotted lines.

When the player is ready to eject the ball or alternatively after a time limit set by a microprocessor has elapsed, which ever comes sooner, an electric solenoid or similar device 19 is actuated to release the tension in the springs 17, and the kicking arm is release and snaps to the ejection position and the ball is ejected. Ball release by the player may be by pressing a button on a hand control, for example hand control item 9 or 10.

However split seconds before solenoid 19 is actuated, a further solenoid 22, operates a lever mechanism which shortens the suspension means of the holding plate 3 which raises the plate above the height of the diameter of the ball by raising the plate 3 clear of the ball, allowing the ball to be cleanly ejected via the loaded springs number 17.

The driver or microprocessor re-extends the actuator 16 to re-compress the springs 17 and release the actuator solenoid 22, so that the ball holding plate 3 returns to its position nearer the playing surface at a distance away from the playing surface, less than the diameter of the playing ball therefore the mechanism has reset awaiting the player on the machine to re-catch the ball.

FIGS. 11, 12 and 13 show an alternative ball ejection mechanism, which is of novel, low cost construction in that performs several functions and it does not require the provision of two solenoids as indicted in FIG. 8. In this arrangement, ball ejection is by linear displacement of a spring loaded pusher plate.

Referring to FIG. 11, the ball holding plate 3 is attached to arms 70 at a fixed angle, and as the ball 1 enters the machine, it lifts the ball holding plate 3 and the arms 70, which subsequently drop and trap the ball in the cut out 4 of the plate 3, shown more clearly in FIG. 12. This can be arranged to happen in all embodiments.

When the ball is to be ejected, for any of the reasons indicated herein, the spring loading on the pusher plate 72 is released by the release of two latches 74, 76, and the plate is free to shoot forward engaging the ball and propelling it from the machine.

Spring loading of the pusher plate 72 is by means of a linear actuator, which may be electric, hydraulic or pneumatic, and immediately after ejection of the ball, the actuator extends to its full stroke taking the latches 74, 76 with it until they re-engage the pusher plate and latch same by locating in a male spigot 78.

The actuator then immediately retracts, taking with it the pusher plate 72 and compressing the springs which act on the pusher plate 72, in effect reloading the device. The retraction of the actuator is by 80% of its possible retraction at this stage. The device is now loaded for further actuation when the ball is received.

Specifically, in the ball ejection, the actuator retracts by another 10% (approximately 10 mm in a specific example) of its stroke, and during this movement, the ball holding plate 3 is lifted by cam 80, by engagement with the lifting bar 82, which in turn lifts the arms 84, which carry the plate 3. The plate 3 is thereby lifted clear of the ball.

With the final retraction of the actuator the springs are fully loaded and the latches 74, 76 are released as described by wedge 86 engaging the latches. The pusher plate is therefore released to propel the ball as described.

The arrangement of FIG. 14 is similar to that of FIG. 13, except that the devices has two wedges which force the latches apart in parallel manner. It is believed that this will provide a stronger and more reliable construction.

FIG. 17 shows yet another embodiment of the invention wherein there are two catching locations 150 and 152 at the front of the machine, each with its own ball holding means in the form of plates 154, 156, and each location 150 and 152 is provided with its own propelling mechanism 158 and 160, which is similar to the propelling mechanism described with reference to FIGS. 11 to 14. The propelling mechanism are shown angled to one another at an angle of approximately 45°, but they could be parallel or arranged at another angle.

One aspect of the invention is the provision of holding means for temporarily holding the ball in the holding position, to prevent it from undesirably running out of the inlet for any reason such as the vehicle being driven in reverse, the vehicle braking, or the ball tending to bounce off the member (such as plate 21 of FIG. 5) which stops it when it enters the apparatus.

Another invention is the means for holding the ball in a best location in relation to the steering characteristics of the vehicle to minimise ball scrub when the vehicle is being turned about a centre within its own dimensions.

Another aspect of the present invention is that the actuation arrangement of FIGS. 11 to 14, a single movement of the actuator in one direction fully charges the springs, lifts the ball holding means and operates the release mechanism

What is claimed is:

1. An apparatus which in use is propelled over a surface and has a means (3) whereby a play member comprising a ball (1), which moves over the surface, can be caught by the apparatus, held thereby, and eventually propelled from the apparatus over the surface towards an objective, said apparatus including a ball holding plate means (3) which rests on the top of the ball (1) when it has been caught by the apparatus, to prevent unwanted discharge of the ball (1) from the apparatus.

2. An apparatus according to claim 1, wherein the plate means (3) rests on the ball (1) by virtue of its own weight.

3. An apparatus according to claim 1 or 2, wherein the plate means (3) is carried by a guide which is slidably held in a frame part of the apparatus, so as to be free to move up and down in the frame.

4. An apparatus according to claim 3, wherein a suitable stop limits the extent to which the plate means (3) drops, and defines the initial position.

5. An apparatus according to claim 1, wherein the apparatus is such that the ball is caught at the front and propelled from the front.

6. An apparatus according to claim 1 wherein the plate means (3) is provided with anti-friction means, which engage the ball (1) and limit the friction between the ball (1) and the plate means (3) as the ball (1) is carried with the apparatus during movement thereof.

7. An apparatus according to claim 1, wherein the plate means (3) has an aperture therein in which the ball (1) engages to locate same in the apparatus.

8. An apparatus according to claim 1, wherein there is a propelling means (17, 19, 20) for propelling the ball (1) from the location in which it is held by the plate means (3), and there is further a raising means (22) for raising the plate (3) immediately before the operation of the propelling means.

9. An apparatus according to 1, wherein the apparatus is power driven and includes a touch sensitive device whereby when the apparatus by this device touches another object with sufficient force, the apparatus is automatically stopped, or a warning signal is given.

10. The apparatus according to claim 1, wherein the objective comprises a goal.

* * * * *